US006564983B2

(12) United States Patent
Ludwig

(10) Patent No.: US 6,564,983 B2
(45) Date of Patent: May 20, 2003

(54) APPARATUS FOR CONTROLLING WEB TENSION

(75) Inventor: Bernd Ludwig, Niederkassel (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 56 days.

(21) Appl. No.: 09/802,122

(22) Filed: Mar. 8, 2001

(65) Prior Publication Data

US 2002/0000458 A1 Jan. 3, 2002

(30) Foreign Application Priority Data

Mar. 11, 2000 (DE) ........................................ 100 11 943

(51) Int. Cl.[7] ........................ B23Q 16/00; B65H 20/00; B65H 23/24

(52) U.S. Cl. ...................... 226/45; 226/97.2; 242/417.1

(58) Field of Search .......................... 226/43, 45, 97.1, 226/97.2; 242/417.1, 418.1

(56) References Cited

U.S. PATENT DOCUMENTS 3,861,207 A * 1/1975 Barbee ........................ 226/45
5,392,977 A * 2/1995 Kato ........................... 226/45
5,709,352 A * 1/1998 Rogers et al. ........... 242/417.1
6,095,391 A * 8/2000 Fiske et al. .............. 242/417.1

FOREIGN PATENT DOCUMENTS

| | | |
|---|---|---|
| DE | 3427914 C1 * | 9/1985 |
| DE | 39 36 038 | 5/1991 |
| EP | 0822155 A | 2/1998 |
| JP | 05 322681 | 12/1993 |

* cited by examiner

*Primary Examiner*—Michael R. Mansen
(74) *Attorney, Agent, or Firm*—Hubert Dubno

(57) ABSTRACT

An apparatus for controlling the web tension in a perforation-welding system for making bags from synthetic resin foil webs in which whistling noises are eliminated by passing the web over a wall of a polygonal duct having an air outlet opening to which compressed air is fed. The air cushion and hence the spacing of the web from the wall is measured by an ultrasonic detector on the opposite of the web.

13 Claims, 3 Drawing Sheets

APPARATUS FOR CONTROLLING WEB TENSION

FIELD OF THE INVENTION

My present invention relates to an apparatus for controlling web tension and, more particularly, to an apparatus which is used in the production of bags with perforation welding tools to control the tension between an upstream pair of feed rollers and a downstream pair of withdrawal rollers.

BACKGROUND OF THE INVENTION

In the production of bags, for example, a synthetic resin foil web is moved past a perforating-welding head between an upstream pair of feed rollers and a downstream pair of withdrawal rollers. The tension in the web at perforation welding to form the individual bags, e.g. in the production of rolls of such bags, is of importance. To control the tension, a guide roller was provided on one side of the web and on the other side a tension sensor was disposed to determine the actual tension value. This sensor was in the form of a blowing tube which was connected to a compressed air source and directed onto the web through at least one air outlet opening cooperating with a measured value unit which controlled the speed of the feed roller pair or the withdrawal roller pair, preferably the latter.

As noted, in the production of bags with perforated-weld seams it is necessary, especially in the region of the perforations and perforation-welding head that the web tension not exceed a predetermined value. If the web tension is too great in this region, the web segments adjoining one another at the perforation-weld seam tend to pull apart and the weld seam quality is damaged. This can occur at even relatively small web tensions since the foil web in the region of the perforation-weld seam is generally brought to an elevated temperature and is more or less plastified thereby.

To avoid these drawbacks or to keep the danger to the web at the perforation-weld seam as small as possible, it has been found that the bag should be practically in a tension-free condition at the point of the perforation-weld seam formation and/or that the still warm weld seam not be mechanically stressed. This ensures optimal seam quality.

For this purpose, a special sag or looseness control is applied whereby the web passes beneath guide rollers and between them and can be looped through substantially 180° and subjected to a compressed air flow. The web assumes a greater or lesser distance from the blowing tube depending upon the pressure and this distance can be measured by a sensor which can output control pulses to the drive of either the feed roller pair or the withdrawal roller pair or both. In this way excessive tensions in the web can cause the withdrawal roller pair to be driven at lower speed to reduce the tension and thus equalize the tension in the web.

It has been found that with the above-mentioned earlier web tension control unit which requires a relatively large looping angle of the web, that significant friction arises with the consequence that slip occurs at the withdrawal roller pair and/or that the sag or looseness does not form at the blowing tube but rather at the feed roller pair. The result is damage to the web, tearing and above all, variations in the bag length and the like. In the travel of the web, significant whistling noise is generated and even the control response is unclean, especially with thick and multilayer foil webs. Because of the offset of the air outlet openings, wavy air cushions are generated which can result in imprecise measurements. Furthermore, with looping of the blowing tube, a second perforation-welding tool or head may be required. In addition, the sag, because of the location of the blowing tube, cannot be readily observed from below. Finally, a matching of the conventional blowing tube to different web widths can be achieved with difficulty and, for example, has required attaching covers by adhesives to the blowing tube at the cost of significant noise development.

OBJECTS OF THE INVENTION

It is, therefore, the principal object of the present invention to provide a web tension controller for producing perforation-welded bags whereby the above mentioned drawbacks are largely eliminated and improved bag making results can be achieved.

Another object of the invention is to provide a web tension controller for the aforedescribed purposes which can operate at low cost and with reduced noise development and especially with the production of less whistling-type noise.

SUMMARY OF THE INVENTION

These objects are attained, in accordance with the invention, by providing on one side of the web the blowing tube and on the opposite side of the web a device for measuring the position of the web, the air from the blowing tube being emitted from an air outlet opening formed in a wall surface which is substantially parallel to the synthetic resin web. In this manner, the especially disadvantageous looping of the blowing tube is completely avoided.

The wall surface can, for example, be part of a polygonal cross section duct extending beneath the web across its entire width. Preferably the duct is a rectangular cross section duct. The outer side of the wall provided with the air outlet opening forms the surface described previously and may lie in a plane which is tangent to the nadir of a guide roller. When guide rollers are provided upstream and downstream of the air box formed by the duct, the nadirs of these guide rollers define a plane and the surface can lie in that plane. The outer side of the wall surface of the rectangular section tube can be offset slightly in the direction of the guide rollers.

Especially effective results are obtained when the wall surface of the duct has a width in the web travel direction which is somewhat smaller than the spacing between the peripheries of the two guide rollers and when the widths of the air outlet openings, which can extend substantially over the entire length of the duct and the width of the web is about one-fifth of the width of the wall surface of the duct provided with the air outlet openings.

With the invention the web tension control is effected with approximately no evolution of noise at the synthetic resin web. The air cushion between the wall surface of the duct and the web is completely smooth and clean so that optimum tension regulation is assured and the spacing and length of the bags and between the neighboring bags or between the web segments remains constant and correct. The rectangular section duct is especially economical and because of the use of the rectangular section duct, the spacing between its wall surface and the web can be measured or established with a high degree of precision from above with an appropriate measuring instrument, for example an ultrasonic sensor.

Because the air outlet opening in the wall of the duct is an elongated hole or longitudinally extending slit, it is simple to reset the effective length of the opening to suit the width of the web since any unnecessary portion of the opening can be closed by a simple magnetic strip. The web tension controller for producing perforation-welded bags from a web of a synthetic resin foil can comprise an upstream pair of feed rollers and a downstream pair of withdrawal rollers which advance the web past a perforation-welding head at a tension determined by relative speeds of the pairs of rollers. The web tension control can comprise:

- a support located between the pairs of rollers;
- a guide roller on the support engaging one side of the web;
- a device on the support for emitting a flow of air in a direction of the web from an opposite side thereof, the device comprising a wall having a surface juxtaposed with and substantially parallel to the web, an air outlet opening in the wall, and blower tube having an outlet communicating with the air opening for producing the flow of air and thereby deflecting the web; and
- a position detector on the support for measuring a position of the one side of the web, thereby determining a value of web tension, and coupled to at least one of the pairs of rollers for operating same to control the web tension.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
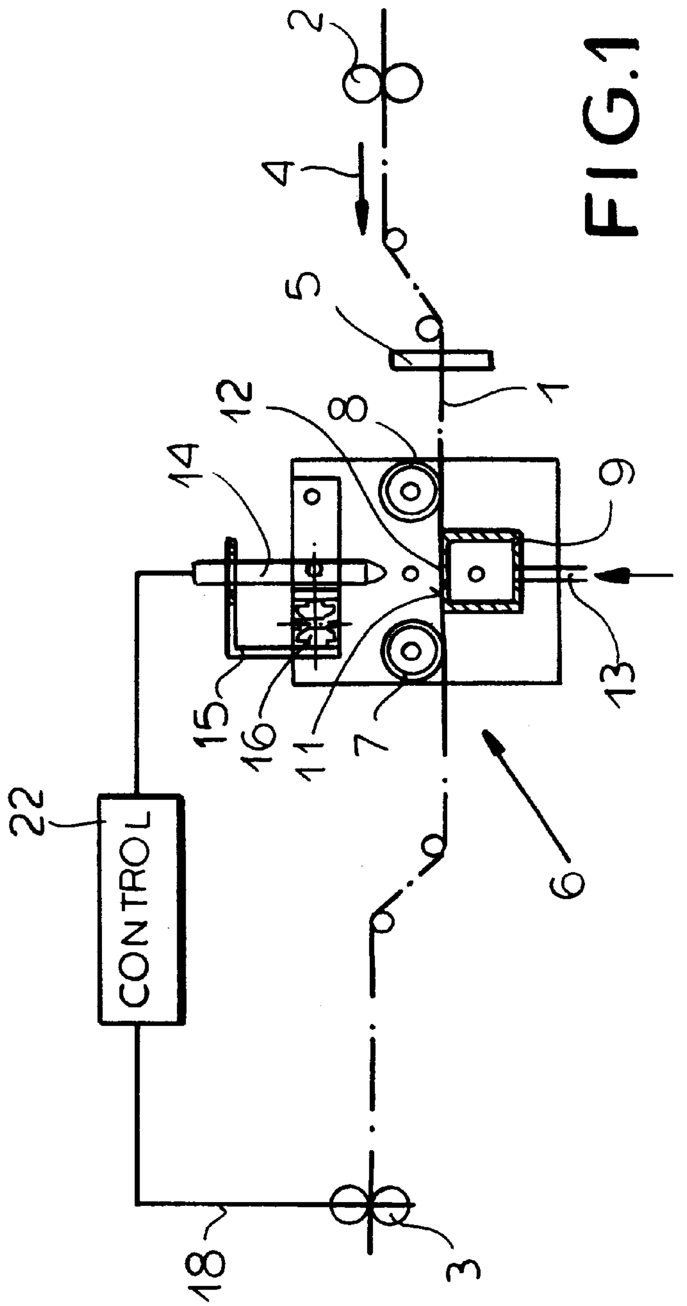
FIG. 1 is a side view in highly diagrammatic form of a web tension controller according to the invention.
Figure 2:
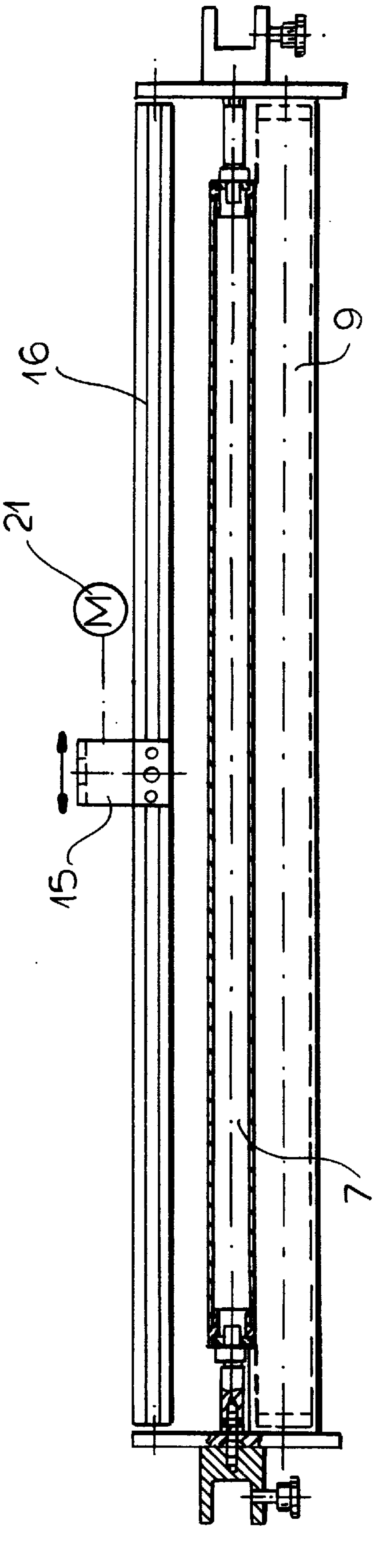
FIG. 2 is a front view, partly broken away thereof.
Figure 3:
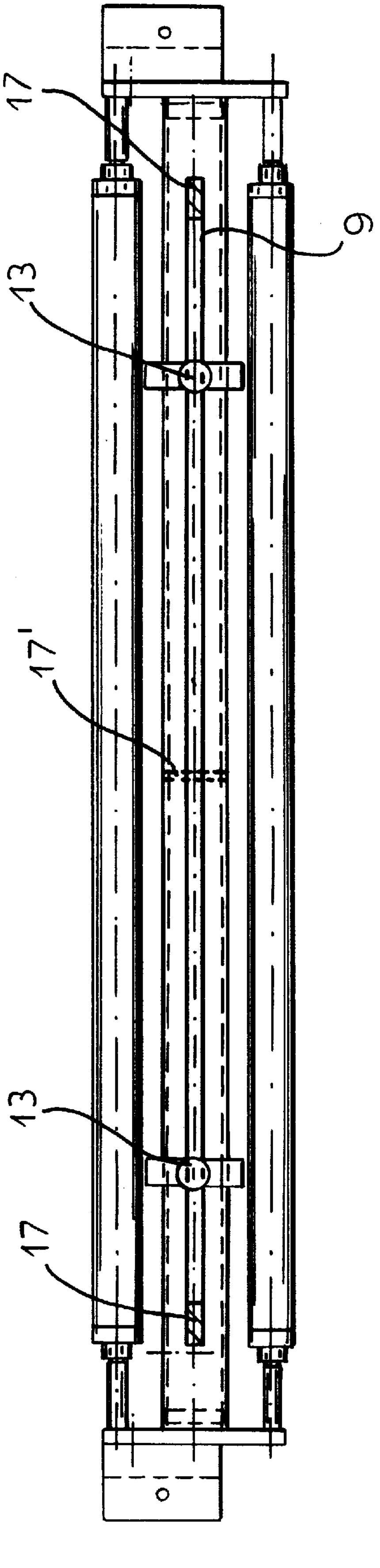
FIG. 3 is a plan view of the device.

The apparatus for web tension control shown in FIGS. 1–3 is traversed by a synthetic resin foil web 1 which is displaced in the direction of arrow 4 by a feed roller pair 2 and a withdrawal roller pair 3. The withdrawal roller pair is driven by a drive, now shown, with a peripheral speed which is greater than the peripheral speed of the feed roller pair 2, preferably 1% to 2% greater.

In FIG. 1 I have schematically shown a perforation welding tool 5 which forms perforation-weld seams across the synthetic resin foil web at specific intervals so that bags are formed. The bags are held together via a perforation weld seam and can be rolled up into a bag roll. The types of bags which may be made can include bottom-seam bags.

So that the perforation weld seam can be made at a location at which the web is substantially tension-free and the transport of the web beyond the perforation welding head should also be tension-free, the apparatus shown in FIGS. 1–3 is equipped with a web tension controller. This device comprises a support 6 which may be a beam extending transversely of the web. On this support 6 and on one side of the web 1, freely-rotatable guide rollers 7 and 8 are provided. In the region between these guide rollers and on the opposite side of the web 1, there is a rectangular cross section duct 9 which has on its side facing the synthetic resin web, a wall surface 11 formed with a longitudinal slit 12 running across the width of the web. On the side of the duct 9 opposite the slit 12, compressed air pipes 13 are connected. The compressed air is delivered to the duct 9 from a compressed air source. Approximately midway along the length of the duct 9 a transverse plate 17' is formed so that the two compartments each has its own compressed air line 13.

Figure 4:
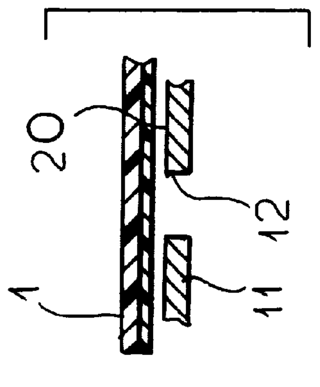
FIG. 4 is a detail view showing the gap between the duct surface and the web.

By appropriate pressurization of the duct 9, an air cushion 20 (FIG. 4) can be formed between the foil 1 and the wall 11 so that this foil will stand approximately several millimeters away from the wall. This spacing is determined by a sensor 14, for example an ultrasonic detector determining the position of the web and which can be adjustable on a guide rod 16. The bracket 15 carrying the sensor 14 can, for example, be displaced back and forth on the guide 16 if desired, a motor 21 being provided for that purpose. Of course it may also be fixed in place at any location across the width of the web. The outer side of the wall 11 and the nadirs of the peripheries of the guide rollers 7 and 8 lie in the same plane. Preferably the wall surface 11 is slightly offset toward the guide rollers 7, 8 so that the foil web 1 in the region of the wall 11 bulges slightly outwardly.

The dimensions of the duct and of the guide rollers 7 and 8 are correlated in that the width of the wall surface in the direction of displacement of the synthetic resin web 1 is less than the distance between the outer peripheries of the guide rollers 7, 8 and the width of the longitudinal slit is about one-fifth of the width of the wall 11.

In the case in which the slit 12 is not fully used for lifting the web 1 away from the wall 11, because the web 1 is narrower than the slit length, the unnecessary portions of the slit are covered by magnetic strips with cover element 17.

The invention is not limited to the embodiments described and can be modified within the scope of the invention. Thus the spacings of the bulge in the synthetic resin web 1 measured by the ultrasonic sensor 14 need not only issue a single measuring pulse via the line 18 to the drive of the withdrawal roller pair 3 but can correspondingly control the speed of the feed roller pair 2. For control purposes, a control unit 22 can be provided between the control roller pair and the position sensor 14. Instead of a single perforation-welding tool 5, two perforation-welding tools can be provided. In that case, the support 6 can be arranged between the two perforation-welding tools.

I claim:

1. A web-tension controller for producing perforation-welded bags from a web of a synthetic resin foil, said web being advanced by an upstream pair of feed rollers and a downstream pair of withdrawal rollers past a perforation-welding head at a tension determined by relative speeds of said pairs of rollers, said web-tension controller comprising:

- a support located between said pairs of rollers;
- a pair of guide rollers on said support spaced apart in a direction of travel of said web and engaging one side of said web;
- a device on said support for emitting a flow of air in a direction of said web from an opposite side thereof, said device comprising a wall having a surface juxtaposed with and substantially parallel to said web between said guide rollers, an air outlet opening in said wall, and blower tube having an outlet communicating with said air opening for producing said flow of air and thereby deflecting said web; and
- a position detector on said support for measuring a position of said one side of said web, thereby determining a value of web tension, and coupled to at least one of said upstream and downstream pairs of rollers for operating same to control the web tension.

2. The web-tension controller defined in claim 1 wherein said wall forms part of a polygonal cross section duct extending across the width of the web below said web.

3. The web-tension controller defined in claim 2 wherein said duct is a rectangular cross section duct.

4. The web-tension controller defined in claim 2 wherein said duct is formed in said wall with a longitudinal slit extending over at least a substantial part of the width of said web and forming said air outlet opening.

5. The web-tension controller defined in claim 4 wherein said slit extends substantially the full length of said duct and the width of said web.

6. The web-tension controller defined in claim 1 wherein said surface of said wall lies in a plane tangent to said guide rollers at lowest points thereof.

7. The web-tension controller defined in claim 6 wherein said wall is a wall of a rectangular cross section duct and the width of said wall is shorter than a distance between outer peripheries of said guide rollers.

8. The web-tension controller defined in claim 7 wherein said air outlet opening is an elongated slit having a width of about one-fifth the width of said surface.

9. The web-tension controller defined in claim 1 wherein said air outlet opening is a slit extending beyond edges of said web, said web-tension controller including cover elements for covering said slit beyond the edges of said web.

10. The web-tension controller defined in claim 9 wherein said cover elements are magnetic strips.

11. The web-tension controller defined in claim 1 wherein said position detector is an acoustic position detector.

12. The web-tension controller defined in claim 11 wherein said position detector is coupled with said downstream pair of rollers for controlling the tension in said web.

13. The web-tension controller defined in claim 12 wherein said perforation-welding head is located upstream of said support.

* * * * *